Feb. 7, 1939. O. L. HERRON 2,145,930
WINDOW
Filed Oct. 30, 1936

INVENTOR
Ollie L. Herron
BY
Harness, Dickey, Pierce & Hann
ATTORNEYS

Patented Feb. 7, 1939

2,145,930

UNITED STATES PATENT OFFICE 2,145,930

WINDOW

Ollie L. Herron, Detroit, Mich., assignor to Herron-Zimmers Moulding Company, a corporation of Illinois Application October 30, 1936, Serial No. 108,441

3 Claims. (Cl. 296—84)

The present invention relates to windows in general and to automobile windows and windshields in particular.

It has been suggested in the past that windows be provided with a pair of parallel spaced panes of glass having an air space therebetween in order to provide increased heat insulation and thereby prevent the transmission of heat from one side of the window to the other, and in applicant's prior Patent No. 1,927,033 an arrangement of this type is disclosed for use in connection with an automobile windshield. It is the general object of the present invention to provide a novel and improved window or windshield of this general character.

A more specific object of the invention is to provide an improved connecting strip for the two panes of glass forming the compound window.

Another object of the invention is to provide an improved method of assembling spaced panes of plain or laminated glass in a window of the above type which method results in the production of a rarified atmosphere between the sheets of glass.

Another object of the invention is to provide an improved windshield or window for an automobile formed of spaced panes of glass, the outer sheet being of plain glass and the inner of laminated glass, whereby minor percussions will break the ordinary glass without damaging or cracking the laminated glass, thus leaving a clear vision for the driver and occupants of the vehicle.

Other objects and advantages of the invention will become apparent from the following specification, the accompanying drawing and the attendant plan.

For a better understanding of the invention, reference may be had to the accompanying drawing wherein like numerals are applied to like parts in the several views.

Figure 1:
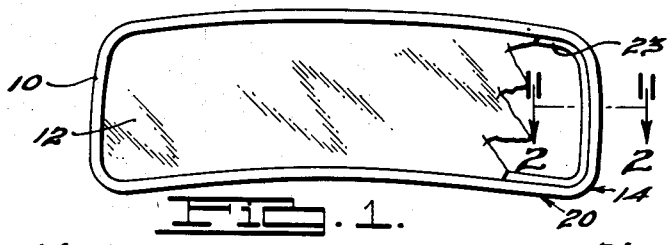
Figure 1 is a front elevation of an automobile windshield.

In Fig. 1 there is shown an automobile windshield having the usual supporting frame 10, which is utilized to support the windshield in the automobile. In the present case the windshield comprises an outer pane of glass 12, and an inner pane of glass 14, spaced from the outer pane of glass in order to provide an air space between the two. While both the inner and outer panes of glass may be either plain sheets or laminated sheets of glass, in the preferred embodiment of the invention shown in Figs. 2, 3 and 5 of the drawing, the outer pane is formed of a plain sheet of glass 12 and the inner pane 14 is of laminated or so-called safety glass. The laminated pane 14 is formed of a pair of sheets of glass 15 and 16 joined together by a layer of cellulosic material 17.

The advantages of providing laminated or safety glass in the windshield and windows on automobiles are well recognized and need not to be mentioned. In the present case, however, there are a number of distinct advantages in providing in a compound window of the type here involved an outer pane of glass which is a single plain sheet as distinguished from a laminated sheet. In the first place it is obvious that the provision of a plain sheet of glass on the outer side not only reduces the cost of the compound window but also materially decreases its overall thickness and, therefore, facilitates its use in an automobile. In addition to these advantages, it frequently happens that a window or particularly the windshield of automobiles is struck by flying stones during driving. This danger is particularly serious when driving on gravel roads, and when an attempt is made to pass a car on such road. In that event stones and pieces of gravel thrown upwardly by the preceding car strike violently against the windshield or in some cases the windows of the car and crack or shatter the same. If these stones strike the ordinary type of laminated glass with sufficient force to fracture the same, the result is the formation of a plurality of radially diverging fissures and cracks which in some cases almost completely obscure the vision of the driver, thus creating a serious driving hazard. In accordance with the present invention, however, this danger is obviated for the reason that the outer pane of glass is not laminated and hence when struck by a stone or piece of gravel will shatter and break away from the mounting thus leaving the driver's vision through the laminated layer unobstructed. If the outer pane is not completely shattered the remaining portions may be readily broken and removed to permit the driver to use the car temporarily. In addition, the outer pane of glass which is of cheaper construction than the inner pane, will in most cases completely absorb the shock of the blow and will thereby protect the more expensive laminated glass layer from breakage or injury.

Figure 2:
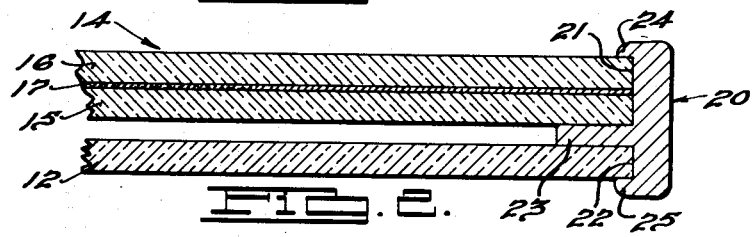
Fig. 2 is a horizontal section taken on the line 2—2 of Fig. 1.

While the laminated and plain layers of glass may be secured together in a number of different ways, in the preferred form of the present invention they are secured together in the manner shown in Fig. 2 by means of an integral edge strip indicated generally at 20. This edged strip may be formed of an extruded metal such as brass or aluminum, or may be formed of moulded rubber, Bakelite, Celluloid, or similar composition. Structurally, the edged strip 20 comprises a pair of inwardly facing spaced parallel channels 21 and 22, adapted to receive the edges of the glass panes 12 and 14, and an intermediate flange or projection 23 which extends between the two panes of glass and holds them in spaced relation. The outer sides of the channels 21 and 22 are formed by inwardly extending flanges 24 and 25, respectively, which form integral parts of the strip and which overlie and closely engage the outer surfaces of the panes of glass 12 and 14, thus firmly and positively holding them in position. It will be observed that by forming the edge strip 20 of an extruded or moulded material of the type mentioned, it is possible to provide a strip which may be curved or otherwise shaped to conform to any desired edge configuration of the pane of glass. Thus the entire strip can be made of one piece or any number of pieces secured together at their abutting ends. If a single continuous strip is used around the entire periphery of the pane of glass it is apparent that this strip will have to be broken in order that it may be spread apart for insertion or removal of the panes.

In accordance with the preferred method of assembling compound windows of the type here involved, a suitable sealing and cementing material is applied to the edges of the glass and the inner surfaces of the channels 21 and 22 of the edge strip 20 whereupon the panes of glass are inserted and pressed into position. Preferably the panes of glass and edge strip are assembled and cemented under high temperatures, that is, the panes of glass, the edge strip and the surrounding atmosphere are preferably at an alevated temperature, in order that the atmosphere which is trapped within the space between the panes 12 and 14 will be rarified at normal temperatures. The provision of the rarified atmosphere between the panes of glass is of considerable importance, first, because it reduces the heat transfer between the panes due to conduction within the air space, and second, because the reduced pressure tends to draw the two panes of glass together, thus holding them in the desired assembled and sealed relation.

Figure 3:
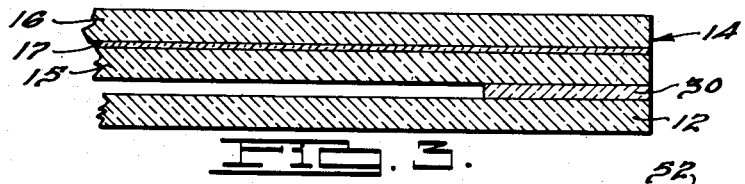
Fig. 3 is a sectional view corresponding to that shown in Fig. 2 of a modified way of securing the panes of glass together.

In Fig. 3 is shown a modified method of assembling the two panes of glass wherein the panes of glass 12 and 14 are secured and cemented to an intermediate gasket 30 which is preferably formed of transparent Celluloid. The same method of assembly is utilized as that mentioned above.

Figure 5:
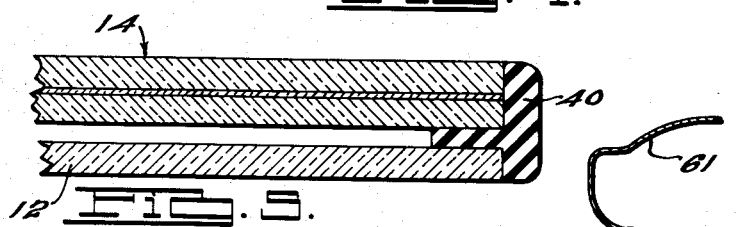
Fig. 5 is a sectional view corresponding to that shown in Fig. 2 of a still further modification of the compound window mounting.

Another method of securing the sheets 12 and 14 together is shown in Fig. 5, wherein the edge strip 40 is similar to that illustrated in Fig. 20 except that it omits the outer flanges which overlie the outer faces of the two sheets of glass. An edge strip of this form may be utilized where there is insufficient room for the outer flange members 24 and 25, shown in Fig. 2. The materials of which strip 40 is made and the characteristics of the strip shown in Fig. 5 are in other respects similar to that shown in Fig. 2.

Figure 4:
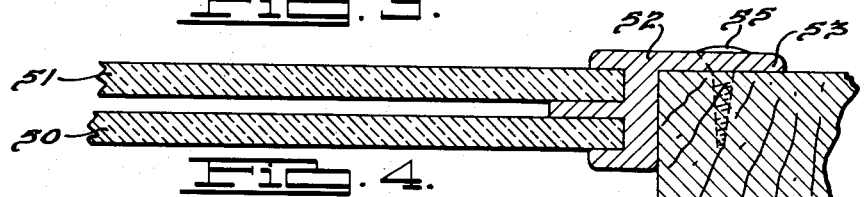
Fig. 4 is a sectional view through one edge of a compound window adapted for use in connection with the conventional window frame commonly used in dwellings and other buildings, and embodying a further form of connecting strip.

In Fig. 4 is shown an application of the mounting strip for a composite window to an ordinary window of the type used in a building construction. Here the two panes of glass 50 and 51 are mounted in spaced channels in an edge strip member 52 which is preferably formed of extruded brass or aluminum, but may if desired be formed of moulded materials, such as rubber, Bakelite, or Celluloid. In this modification, the edge strip 52 is provided with an outwardly extending flange 53, adapted to overlie one face of the conventional window frame 54 and to be secured to the latter by means of screws 55.

Figure 6:
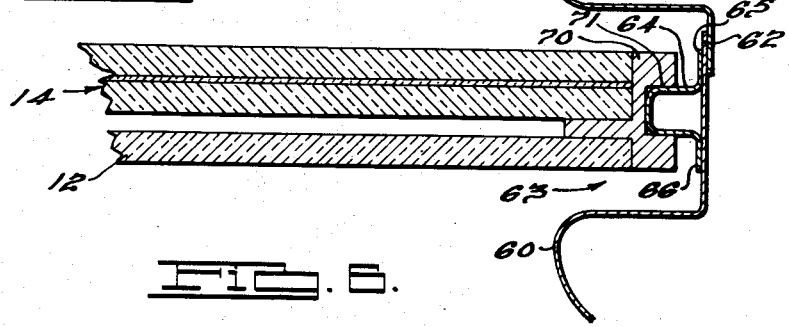
Fig. 6 is a sectional view showing a further modification of the connecting strip adapted for use in connection with vertically sliding window panes.

Fig. 6 shows the application to a vertically sliding window of the type utilized in automobile construction. As there shown, the window opening of the vehicle is defined by paneling 60 and an inside garnish moulding 61 which are connected together at 62 by welding or otherwise and are shaped to define a window pane edge receiving channel 63. A channel shaped sheet metal guide member 64 is secured by welding its legs 65 and 66 to the bottom of the channel 63 in such a position that it may guide the window in the channel 63. The composite window, which comprises face sheets of glass 12 and 14, as before, is held in assembled relation by an edge strip 70 similar to that shown in Fig. 5, except that it is provided with an outwardly opening channel 71 extending parallel to the edges of the panes of glass and of such size and configuration as to receive the guiding channel member 64.

It will be observed that in providing compound windows of the type here involved in connection with the window frames in automobiles that there may be some difficulty resulting from the increased overall thickness of the window pane. Accordingly, it may in certain cases be difficult, if not impossible, to provide guiding strips which engage opposite sides of the panes of glass, as is the present conventional practice. It is for this reason that the channel guiding means 64 and 71 are provided inasmuch as such means does not in any way increase the effective thickness of the window and window guiding means assembly. It will be noted that in Fig. 6, the outward flanges, such as 24 and 25, on the strip 20, shown in Fig. 2, are omitted. It will be understood, however, that if sufficient room is available they may be provided upon the edge strip 70 in Fig. 6. The edge strip 70 in Fig. 6 may be made of the same materials and formed in the same manner as set forth in detail with respect to the strip shown in Fig. 2, however, it is preferable when the strip is to form one of the sliding members of the window assembly to form the strip of extruded metal.

While several embodiments of the invention have been illustrated and described, it is apparent that others are available within the spirit of the specification and drawing, and within the scope of the appended claims.

What is claimed is:

1. An edge strip for securing sheets of glass together in spaced parallel relation comprising an integral strip of material having a pair of spaced channels adapted to receive and closely fit the edges of the sheets of glass, said channels being separated by an intermediate wall adapted to space the sheets apart and having outer walls adapted to overlie the outer faces of the sheets of glass for holding them in position, and said strip having a flange extending parallel to the sides of said channels and in the opposite direction from that in which the channels open for securing the strip to a window frame.

2. In a window construction, means defining a window frame, two panes of glass, an integral strip of metal extending along the edges of said panes for holding them in spaced parallel relation, said strip having an outwardly opening channel therein, and guide means on the stationary window framing extending into said channel, said guide means comprising a sheet of metal bent into a U-shape channel and having the legs of the channel secured to the stationary framing.

3. In combination, a pair of sheets of glass positioned in parallel spaced relation, and means for holding said sheets of glass in said position, said means consisting of an integral edge strip abutting and bonded to corresponding edges of both sheets of glass and having an inwardly directed flange projecting into the space between and bonded to said sheets of glass at the margins thereof, said edge strip and bond between the same and said sheets of glass being of sufficient strength to hold said sheets of glass in said position.

OLLIE L. HERRON.